United States Patent [19]

Johnson

[11] Patent Number: 5,113,377
[45] Date of Patent: May 12, 1992

[54] RECEIVER ARRAY SYSTEM FOR MARINE SEISMIC SURVEYING

[75] Inventor: Peter C. Johnson, Plano, Tex.
[73] Assignee: Atlantic Richfield Company, Los Angeles, Calif.
[21] Appl. No.: 697,637
[22] Filed: May 8, 1991
[51] Int. Cl.⁵ .............................................. G01V 1/38
[52] U.S. Cl. ................................. 367/20; 181/110; 367/154; 367/15
[58] Field of Search ................. 367/2, 3, 4, 5, 6, 15, 367/16, 17, 18, 20, 153, 154; 181/110; 441/2, 7, 21

[56] References Cited
U.S. PATENT DOCUMENTS

| | | | |
|---|---|---|---|
| 2,590,531 | 3/1952 | McLoad | 177/352 |
| 3,212,600 | 10/1965 | Hensley | 181/0.5 |
| 3,539,979 | 11/1970 | Crall | 340/7 |
| 3,722,014 | 3/1973 | Hill et al. | 441/2 |
| 4,010,619 | 3/1977 | Hightower et al. | 61/69 |
| 4,197,591 | 4/1980 | Hagemann | 367/6 |
| 4,254,480 | 3/1981 | French | 367/58 |
| 4,272,835 | 6/1981 | Flood et al. | 367/4 |
| 4,353,121 | 10/1982 | Ray et al. | 367/21 |
| 4,694,435 | 9/1987 | Magneville | 367/17 |
| 4,958,328 | 9/1990 | Stubblefield | 367/15 |
| 4,970,696 | 11/1990 | Crews et al. | 367/15 |
| 4,970,697 | 11/1990 | Earley et al. | 367/15 |
| 5,022,013 | 6/1991 | Dehon et al. | 367/4 |

OTHER PUBLICATIONS

"Navigation Technology", Sales Brochure (Navtech, Jan. 31, 1991).
"866 A Continental Shelf Acoustic Release", Sales Brochure (Benthos Undersea Systems Technology).

Primary Examiner—Ian J. Lobo
Attorney, Agent, or Firm—Vinson & Elkins

[57] ABSTRACT

A vertical hydrophone array and a system of multiple arrays are disclosed. The vertical hydrophone array includes multiple groups of hydrophones mounted along a cable. A floatation device is coupled to the cable at one end, and an anchor is coupled to the cable at another end via a remotely controllable release. Depth transducers and position transponders are preferably mounted along the cable to provide precise depth and position indication to the surface. The release allows for retrieval of the array while leaving the anchor behind, thus reducing the potential for array damage. In the system including multiple arrays, a central positioning anchor is disclosed, through which tensioning cables pass. Each tensioning cable is connected to the float end of a vertical array, so that tension of the tensioning cable allows for control of the angle of the sensor array from the vertical. A clamp is preferably provided so that the position of the array may be held without maintaining tension thereon from the surface.

20 Claims, 2 Drawing Sheets

RECEIVER ARRAY SYSTEM FOR MARINE SEISMIC SURVEYING

This invention is in the field of marine seismic prospecting, and is more specifically directed to receiver arrays in such prospecting.

This application is related to application Ser. No. 697,573, filed contemporaneously herewith and assigned to Atlantic Richfield Company.

BACKGROUND OF THE INVENTION

Prospecting for off-shore hydrocarbon reservoirs relies heavily on seismic data acquisition, even more so than in the on-land case, due to the high cost of off-shore drilling compared to on-land drilling. It is therefore even more important in the field of marine seismic prospecting that the surveys be accurately and efficiently performed, so that high resolution surveys may be performed over reasonable time and at reasonable cost.

A common method for marine seismic surveying uses a vessel to tow multiple hydrophone streamers in the area of a survey. The towed array collects reflected (and, in some cases, refracted) signals from sub-surface strata, and which originated from a conventional seismic source such as an air gun. The seismic source may be towed behind the same vessel as the hydrophone streamers, towed behind a different vessel, or may be fixed in position by way of a buoy or anchor An example of a method for marine seismic prospecting using towed hydrophone arrays, particularly for performing three-dimensional (3-D) prospecting, is described in U.S. Pat. No. 4,970,696 issued Nov. 13, 1990, assigned to Atlantic Richfield Company and incorporated herein by this reference; this patent particularly utilizes separate source boats to accomplish the 3-D survey. Conventional data processing, for example common depth point (CDP) gathering, static correction, normal moveout (NMO), and the like, is performed on the time series data measured by the hydrophones in the towed array.

It has been found that vertical displacement of hydrophones in a marine seismic survey provides important benefits. One method for marine seismic prospecting using such displacement is described in U.S. Pat. No. 4,353,121. This reference discloses a towed hydrophone array where the streamer is slanted to a shallow angle from the horizontal (e.g., 1.75 degrees); the source is also towed from the same vessel in the conventional manner. As disclosed therein, the slant of the cable allows for an increasing time between the arrival of the primary and ghost reflections of the seismic wave over the length of the streamer, with the angle selected to optimally attenuate the ghost reflection in the frequency range of interest This reference discloses that during subsequent processing, including NMO, the primary signal stack from all receivers is enhanced, while the ghost signals are not enhanced since they are not time-aligned in the stack.

Another marine seismic surveying method using vertically displaced hydrophones (and sources) in a streamer is described in U.S. Pat. No. 4,254,480, where the streamer array includes hydrophones at varying depths in a V-shape, to improve the sensitivity of seismic reflections at the angles of interest and to attenuate the reception of undesired reflections.

While the towing of hydrophone arrays is a widely accepted method of gathering marine seismic data, certain limitations are inherent therein. First, the actual position of the sensors may differ from that assumed, due to currents, wind and wave action. Subsequent data processing must take such shifts in hydrophone position into account to avoid error in the result. Secondly, the time required to perform such surveys over a large area of the ocean floor may be quite significant, as many passes of the streamer vessel may be required to cover the desired area. Thirdly, the path of the vessel may be blocked from the area of interest, for example if an existing offshore drilling platform is in the survey area (as is often the case in areas of interest, particularly where additional seismic surveys are useful to supplement drilling information).

Accordingly, another method of marine seismic prospecting utilizes geophones, such as used in on-land prospecting, or alternatively hydrophones, placed on the seafloor in a single line or in a set of parallel lines Communication of the sensed information to the surface is performed by hardwired connection, or by telemetry. U.S. Pat. No. 2,590,531 and U.S. Pat. No. 3,212,600 describe examples of arrangements of seismic sensors on the seafloor After placement of the line or lines of sensors, the seismic survey is performed in the usual manner by energizing a seismic source in the water, and with the bottom-deployed sensors recording data in the conventional manner. While seismic surveys using such bottom sensors obtain the desired survey data, the cables connecting the sensors in the lines are subject to damage during deployment or retrieval, from causes such as abrasion from the seafloor during movement of the cables.

In modern surveys using bottom sensors, the position of each of the sensors may be accurately determined from the non-refracted direct arrival energy from the source. It has been found, however, that most bottom sensors in an array will receive both refracted and non-refracted energy Separation of the non-refracted energy from the total received signal, to determine the position of the sensors, requires complicated analysis techniques.

By way of further background, vertical arrays of hydrophones are useful in performing marine seismic surveys of various types. U.S. Pat. No. 4,958,328 describes a vertical array for marine vertical seismic profiling. The vertical array has a cable with hydrophones spaced therealong, and which has an anchor on one end and a floatation device at the other. Smaller buoyancy floats are mounted at the surface end of the cable, along with a telemetry buoy; the smaller floats and the buoy can move with wind and wave action, while the larger floatation device maintains the array in a vertical attitude. A vessel tows a seismic source along the profile line on either side of the vertical array to perform the 2-D or 3-D survey.

U.S. Pat. No. 4,970,697 describes another vertical seismic array, particularly directed to seismic surveys using reflected signals, particularly in locations near offshore drilling platforms. The described vertical arrays have a cable or chain which is connected to a vessel, and to which the hydrophones are mounted. One end of the cable has a weight, and the other has a float, so that the array is maintained in a vertical attitude, whether anchored to the seafloor or suspended in the water.

U.S. Pat. No. 4,694,435 describes a towable vertical seismic array, as used in refraction seismic survey operations. The array is tubular, with a weight and fins at the distal end from the vessel, and which has some internal buoyancy. The weight causes the array to be vertical when deployed, and the fins allow the array to be towed without twisting of the cable.

U.S. Pat. No. 3,539,979 describes a vertical seismic array for suspension from a buoy. The array has units suspended along the cable which, when elevated, allows hydrophones to spring horizontally away from the cable and establish the hydrophone array.

It is an object of this invention to provide an array of marine seismic sensors which are fixed in position to the seafloor, but which can be deployed and retrieved with reduced risk of damage.

It is a further object of this invention to provide such an array which provides accurate positioning information.

It is a further object of this invention to provide a system of such arrays which allows for horizontal positioning of the arrays from the surface while still maintaining a fixed bottom position.

Other objects and advantages of this invention will be apparent to those of ordinary skill in the art having reference to the following specification together with the drawings.

SUMMARY OF THE INVENTION

The invention may be implemented into an array of seismic sensors, such as hydrophones, for use in marine seismic surveying. The array includes a cable which has a plurality of hydrophones mounted thereto. Transponders are also preferably mounted at multiple locations along the cable, for communicating position and depth information to the surface. The cable is connected on one end to a flotation device, and on the other end to an anchor by way of a remotely controllable release, so that a substantially vertical attitude may be maintained. The release allows for ease of retrieval of the array upon completion of the survey.

The invention may also be implemented into a system of such arrays. In such a system, a tensioning cable is connected to each array near the flotation device, and to a surface vessel via a central anchor. Control clamps in the center anchor engage the tensioning cable, so that the surface vessel can control the horizontal displacement of each array according to the length of tensioning cable between the center anchor and the point at which the tensioning cable connects to the array.

DETAILED DESCRIPTION OF THE PREFERRED EMBODIMENTS

Figure 1:
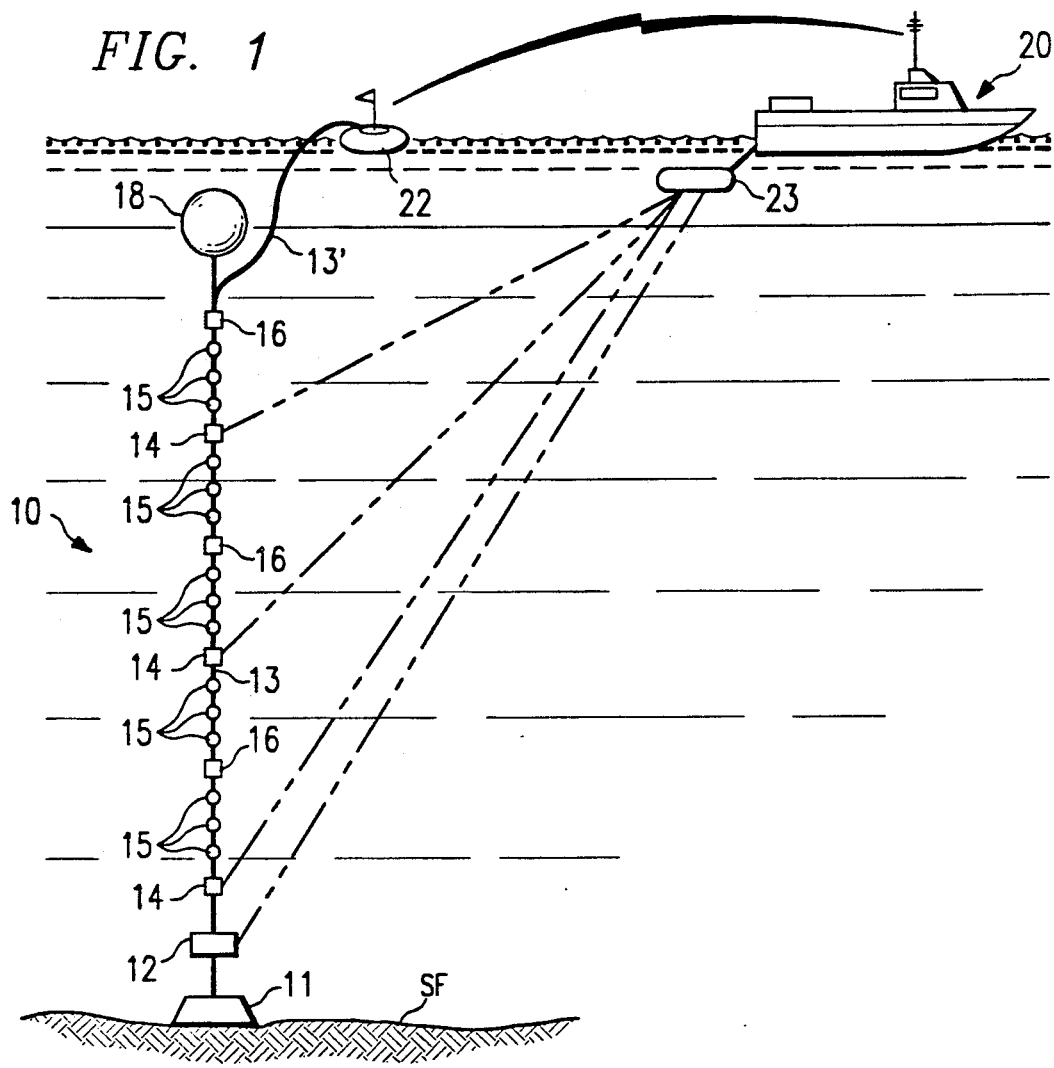
FIG. 1 is a schematic diagram of a vertical sensor array according to a first embodiment of the invention.

Referring now to FIG. 1, a first embodiment of an array 10 according to the invention will be described. It should be noted that, while the following description is directed to "vertical" arrays, for purposes of the invention the arrays need not be disposed in a vertical attitude, or even close to a vertical attitude. As will be described in further detail hereinbelow, for certain types of surveys, the "vertical" arrays may be deployed closer to a horizontal attitude than a vertical attitude. In each case, however, vertical displacement of the arrays described herein maintains the hydrophones, transducers and other sensors in a raised position off the seafloor, so that damage from abrasion thereagainst during deployment and retrieval is avoided.

Array 10 of FIG. 1 includes a number of groups of hydrophones 15 mounted along a cable 13. Anchor 11 is connected to one end of cable 13, via a remotely controllable release 12, as will be described in further detail hereinbelow. Floatation device, or float, 18 is coupled to the other end of cable 13. Cable 13 is constructed in the conventional manner for marine seismic surveys, to accomplish structural connection and placement of hydrophones 15 therealong, and to accomplish electrical communication thereamong. For example, cable 13 may be constructed in the manner described in the above-referenced U.S. Pat. No. 4,958,328, incorporated by reference, having the appropriate number of twisted-pair resin-insulated conductors for the components mounted therealong, with mechanical protection and strength provided by a resin coating over the conductor bundle and a jacket of synthetic fiber braid to provide significant breaking strength in cable 13. It is contemplated that other conventional types of physical construction of cable 13 may be used, depending upon the particular application of array 10 desired.

As noted hereinabove, hydrophones 15 are mounted to cable 13 in groups therealong. While FIG. 1 shows hydrophones 15 in groups of threes, other groupings of hydrophones 15 will also be suitable in the present invention. In addition, five groups of hydrophones 15 are shown in FIG. 1 for the sake of illustration; it is contemplated that, in practice, eight to thirty groups of hydrophones 15 will be used with an array 10.

In this embodiment of the invention, cable 13 has an extension 13' connected to buoy 22. Buoy 22 is a conventional radio buoy, capable of receiving an electrical signal from cable extension 13' and transmitting the same to vessel 20 by radio. As is well known in the art, such radio buoys, such as those manufactured and sold as "TELSEIS" or "DIGISEIS 400" buoys, also include amplifier and digitizer circuitry therein. The appropriate electrical terminations should be installed according to the conventional manner at the buoy end of cable extension 13', to present the appropriate matching impedance to the transmitting circuitry of the components along cable 13.

It should be noted that several alternative termination and transmission techniques may be used for array 10 according to this embodiment of the invention. In the example discussed above, where the data is transmitted by way of telemetry from array 10, the electrical terminations of cable 13 are at its top end. Alternatively, the electrical terminations may be located near the bottom end of cable 13, or at locations along the length of cable 13, particularly where data communication from array 10 will be done by way of hard-wired digital or analog communication. For example, a "can" may be located at a selected location along the length of cable 13, at which the electrical terminations of cable 13 are located, and from which electrical cabling extends to the surface, to other arrays 10, or to some other intermediate location for eventual transmission to the surface.

According to the present invention, array 10 also includes components along cable 13 for precisely indicating the position of each portion of array 10 to surface vessel 20. A first type of such components incorporated into array 10 are position transponders 14, mounted along cable 13 at multiple locations therealong. Position transponders 14 receive and transmit signals, such as acoustic signals, from and to a known location, such as an acoustic transmitter/receiver 23 towed by surface vessel 20 as shown in FIG. 1. In the conventional manner, position transponders 14 allow accurate determination of their position in the X-Y plane (i.e., their azimuthal orientation and position), based on the time delay between the transmission of a signal thereto and the receipt of a signal therefrom. Alternatively, an anchored buoy may be the site of the transmitter/receiver 23. Different types of conventional position transponders 14 useful in array 10 include acoustic transponders such as the model 2410transponder and accompanying system, manufactured and sold by Navigation Technology, and also include laser transponders.

According to this embodiment of the invention, the acoustic or laser energy emitted by the transponders (if acoustic, preferably at frequencies outside of the seismic energy band of the survey) are communicated to surface vessel 20 directly, and not along cable 13 with the seismic information (described hereinbelow). Accordingly, the positioning information is transmitted and received independently from the seismic information. In the conventional manner, for example by way of GPS, radio positioning, and the like, surface vessel 20 can precisely determine the position of array 10. According to this embodiment of the invention, provision of multiple position transponders 14 allows for array 10 to be deployed at varying angles from the vertical, without degradation of the survey results, as the precise position of the array is monitored according to this embodiment of the invention.

Array 10 further includes depth transducers 16 mounted at multiple positions along the length of cable 13. Each depth transducer 16 is constructed to sense water pressure, and accordingly its depth below the surface of the water, and to generate an electrical signal corresponding to the sensed pressure in the conventional manner. Examples of conventional depth transducer useful in this embodiment of the invention are those manufactured and sold by Teledyne. In this embodiment of the invention, it is preferred that depth transducers 16 communicate the sensed pressure and depth information in the same manner as hydrophones 15 communicate the sensed seismic signal. Accordingly, depth transducers 16 are coupled into cable 13, for transmission of the depth information via radio buoy 22.

It should be noted that there are multiple depth transducers 16 mounted along cable 13 in this embodiment of the invention. Similarly as in the case of position transponders 14, this allows for accurate and precise depth information to be communicated in cases where array 10 is at an angle from the vertical.

As noted hereinabove, array 10 includes a remotely controllable release 12, coupling cable 13 to anchor 11. In this embodiment of the invention, release 12 allows for cable 13 to be detached from anchor 11 upon completion of the marine seismic survey, facilitating retrieval of array 10 by a surface vessel. Control of release 12 is preferably accomplished by a signal from vessel 20 (or from another surface location or vessel). Such control may be implemented via an acoustic signal from vessel 20; as shown in FIG. 1, an acoustic transmitter/receiver 23, towed by vessel 20, may operate to send the control signal to release 12. Alternatively, the control signal may be communicated through cable 13 itself where, for example, radio buoy 22 receives radio signals from vessel 22 for controlling release 12, and converts such signals to the format necessary for communication along cable 13 to release 12; further in the alternative, a direct hard-wired connection may be made between release 12 and the surface location or vessel controlling the same.

Figure 2:
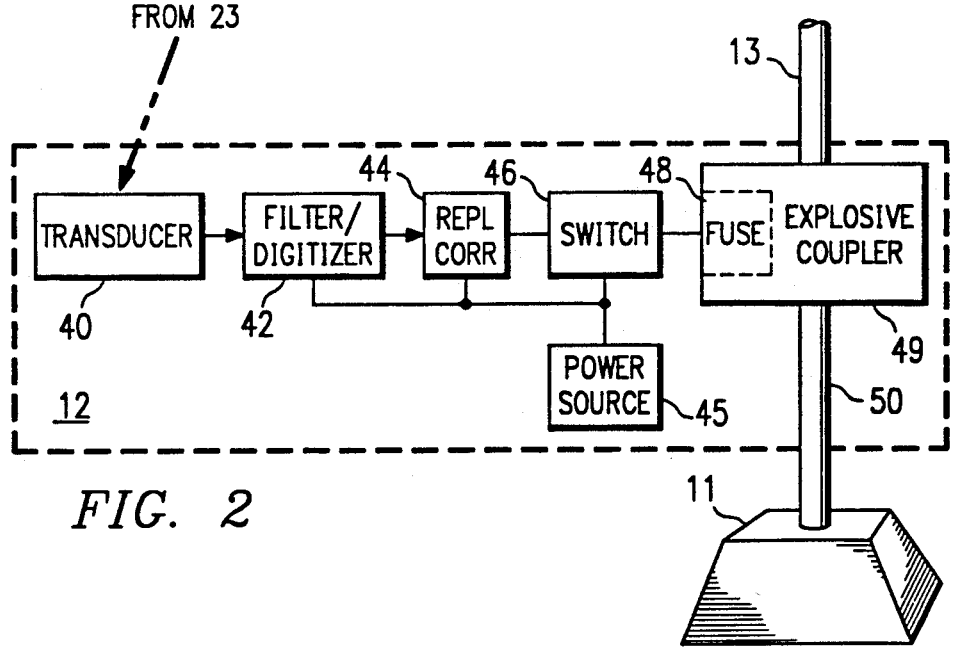
FIG. 2 illustrates a remotely controllable release in the array of FIG. 1.

Referring now to FIG. 2, the preferred example of release 12 will be described in further detail. Examples of commercially available acoustic releases include models 865-A and 866-A acoustic releases manufactured and sold by Benthos Undersea Systems Technology. Release 12 of FIG. 2 is an acoustic release, controlled by acoustic signals from transmitter/receiver 23 towed by vessel 20 in FIG. 1. Acoustic release 12 includes a conventional acoustic transducer 40 for receiving acoustic signals, for example from acoustic transmitter/receiver 23 of FIG. 1. The output of acoustic transducer 40 is connected to a conventional filter/digitizer circuit 42, which formats the electrical signals into appropriate form for analysis by replica correlator 44, to which the output of filter/digitizer 42 is connected. For example, if the received acoustic signal communicates data by way of modulation (e.g., frequency shift keyed, or FSK, modulation), filter/digitizer 42 may include a demodulator circuit for converting the modulated signal to a serial digital data stream.

As noted hereinabove, filter/digitizer circuit 42 has its output coupled to replica correlator 44. Replica correlator 44 is a conventional circuit for comparing the data communicated by the acoustic signal, formatted by filter/digitizer as appropriate, against a particular code assigned to acoustic release 12. The output of replica correlator 44 presents a signal corresponding to whether or not the most recently received data matches the preassigned code stored therewithin.

Each of the circuits in acoustic release 12, including filter/digitizer 42 and replica correlator 44, is biased by power source 45, which is preferably a battery due to the isolation of acoustic release 12 from the surface; alternatively, cable 13 may carry a power line from a battery or other power source located at the surface, if desired. Switch 46 has a control input coupled to the output of replica correlator 44, and is coupled to power source 45 and fuse 48 in explosive coupler 49, in such a manner that the output of replica correlator 44 controls whether or not power source 45 is connected to fuse 48.

Explosive coupler 49 is a conventional coupler for connecting cable 13 to cable 50; cable 50 being connected to anchor 11. Explosive coupler 49 also includes an explosive charge which, when activated, will disengage cable 13 from cable 50, thus releasing cable 13 from anchor 11. Fuse 48 is a conventional fuse for such releases, for example a strip of magnesium metal, sized so that it will burn when power source 45 is connected thereto. The explosive in explosive coupler 49 is physically adjacent to fuse 49, so that the burning of fuse 49 will detonate explosive coupler 49, resulting in disengagement of cable 13 from cable 50.

As noted hereinabove, the acoustic signals which activate acoustic release 12 are preferably modulated signals carrying a digital data stream, with a particular serial data code assigned to acoustic release 12, and stored within replica correlator 44. This allows acoustic transmitter/receiver 23 to transmit information to other components of the system, such as position transponders 14, without causing the activation of acoustic release 12. Prior to activation of acoustic release 12, during such times as acoustic signals to other components, or no acoustic signals, are being transmitted, the output of replica correlator 44 is at a level such that switch 46 is maintained in the open condition.

At such time as the survey is complete, personnel on vessel 20 cause acoustic transmitter/receiver 23 to transmit a modulated acoustic signal containing the code assigned to acoustic release 12. As with non-matching signals, these acoustic signals are received by transducer 40, converted into an electrical signal which is filtered and formatted (i.e., demodulated), and applied to replica correlator 44. At such time as the transmitted data matches the assigned code for acoustic release 12, replica correlator 44 issues the appropriate signal to switch 46, so that power source 45 is coupled to fuse 48 in explosive coupler 49. Fuse 48 then burns to cause explosion of the explosive material in explosive coupler 49, releasing cable 13 from anchor 11.

Array 10 may now be easily retrieved, either by retrieval of float 18 as it floats to the surface, or alternatively by connecting a winch to array 10 prior to its release from anchor 11, and pulling array 10 on board after such release occurs. In either case, abrasion of array 10, against the seafloor, and the resulting mechanical damage thereof, is avoided.

Figure 3:
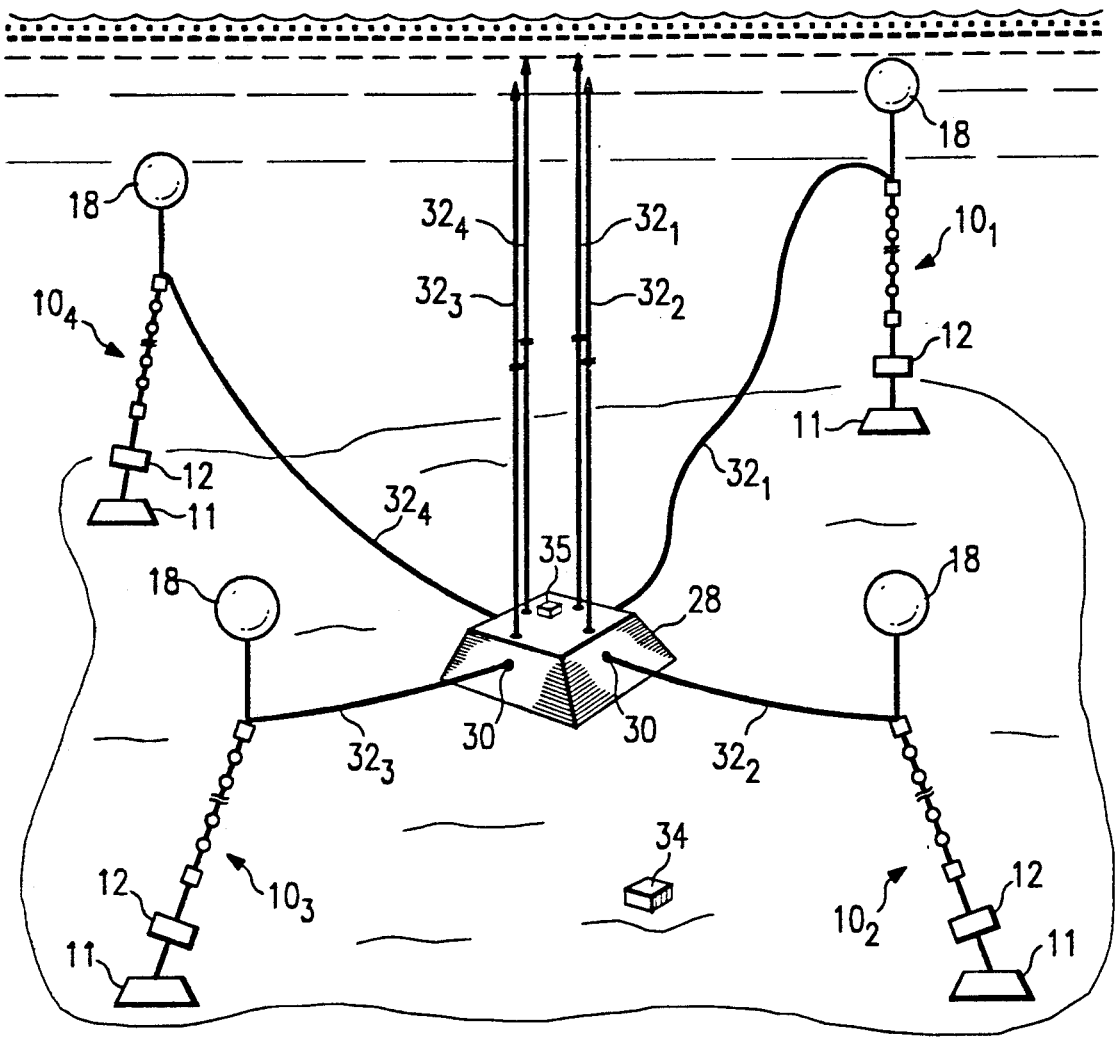
FIG. 3 is a schematic diagram of a system of sensor arrays according to an alternate embodiment of the invention.

Referring now to FIG. 3, a system incorporating multiple
s of arrays 10 is shown. As described in application Ser. No. 697,573, filed contemporaneously herewith, assigned to Atlantic Richfield Company and incorporated herein by this reference, an arrangement of marine hydrophone arrays having fixed and known locations relative to the seafloor is useful in performing efficient and accurate 3-D marine seismic surveys, particularly relative to azimuthal gathering of seismic data, as is particularly useful in generating a true 3-D survey. The system of FIG. 3 is particularly adapted to such a survey, as well as to other known types of surveys.

In the system of FIG. 3, each of the arrays 10 are constructed similarly as described hereinabove relative to FIGS. 1 and 2. Each array 10 has a cable 13 to which hydrophones 15, depth transducers 16, and also preferably position transponders 14, are mounted along its length. Cable 13 is coupled via release 12 to disposable anchor 11 at one end thereof, and to float 18 at the other end. As shown in FIG. 3 relative to array $10_2$, an optional secondary float 26 may be connected to the end of cable 13 attached to release 12. The secondary float 26 will rise to the water surface upon release 12 letting go of cable 13, so that retrieval of array $10_2$, in this example, could be effected from that end.

As noted hereinabove, various methods for communication of the data from arrays 10 to the surface may be utilized. For example, electrical terminations may be located near the top end of each array 10, near the locations at which tensioning cables 32 (to be described in further detail hereinbelow) are connected; electrical communication cabling may, in such a case, be located within or along tensioning cables 32, for communication to the surface therealong. Alternatively, radio buoys as described hereinabove may be deployed from each array 10, for communication of the seismic and depth information from each array 10 by way of telemetry. Further in the alternative, terminations of cables 13 in arrays 10 may be provided near its bottom end or at a selected location along its length, with additional hardwired cabling used to communicate the signals from each array 10 to a central location, such as central anchor 28 described hereinbelow, to another array 10, or to another location in the system for eventual communication to the surface.

Each array 10 in the system of FIG. 3 also includes a tensioning cable 32 connected near float 18 at an end thereof. Each tensioning cable 32 passes through central anchor 28, and extends to the surface where its tension and length is controlled from a surface vessel or platform (not shown in FIG. 3 for purposes of clarity). The disposable anchors 11 are preferably disposed about central anchor 28 in a symmetrical fashion, for ease of interpretation of the seismic survey. In this embodiment of the invention, tensioning cables 32 pass into the top of central anchor 28 and out the side thereof nearest the associated array 10. The surface vessel or platform will have conventional winches and pulleys for winding or releasing tensioning cables 32.

Anchors 11 define the position of one end of each of arrays 10. The position of the float end of each of arrays 10, and hence its angle relative to the vertical, is controlled by the length of its associated tensioning cable 32 in the embodiment of FIG. 3. If, for example, the length of tensioning cable 32 between central anchor 28 and array 10 is sufficiently long, float 18 for the array 10 will be allowed to maintain array 10 in a vertical attitude; tensioning cable 32 will have slack between central anchor 28 and its associated array 10 in such a case. In the example of FIG. 3, array $10_1$ is in such a vertical position, due to the slack length of tensioning cable 32 between central anchor 28 and array $10_1$.

If the length of tensioning cable 32 between central anchor 28 and its associated array 10 is held to be quite short, however, the float end of the associated array 10 will be pulled toward central anchor 28, and thus toward the horizontal. The shortening of this length of the tensioning cables is accomplished by the winch and pulley system of the surface vessel or platform, as noted hereinabove. In the example of FIG. 3, array $10_2$ is in such a lowered position, as the length of tensioning cable $32_2$ between central anchor 28 and the float end of array $10_2$ is relatively short.

It should be noted that each of anchors 11 may optionally include a reel and variable lead length cable between itself and its associated release 12 in its array 10. This reel would preferably be spring loaded with a relatively strong retracting force, so that as the associated tensioning cable 32 is pulled from the surface through central anchor 28, a portion of the variable lead length cable would be pulled out of the reel of anchor 11. In such an arrangement, tensioning cable 32 could not only control the angle of each array 10 from the vertical, but could also control the lateral position of hydrophones 15 in each array 10 once the angle closest to the horizontal were obtained. It should be noted that the use of positioning transponders 14 within arrays 10 would be especially useful in this alternative embodiment, as the actual position of the array 10 could be determined from positioning transponders 14 without requiring precision calibration of the length of tensioning cable 32 as measured at the surface.

It is preferred that central anchor 28 include a control clamp 30 for each tensioning cable 32. According to this embodiment of the invention, control clamps 30 are provided within central anchor 28, at the location from which its associated tensioning cable 32 extends toward an array 10. Alternatively, control clamps 30 may be located on a surface of central anchor 28, for example the top surface near an edge, or along the side surface nearest an associated array 10. Each control clamp 30 is for clamping the position of tensioning cable 32 passing therethrough. Accordingly, control clamps 30 maintain tension on the portion of tensioning cable between central anchor 28 and its associated array 10, without requiring force from the surface vessel or platform. This allows the surface vessel or platform to leave unattended the location of the vertical array system, once the lateral positioning of the arrays 10 is established. It should be noted that the ends of tensioning cables 32 may have floats or buoys attached thereto, to facilitate retrieval.

Figure 4:
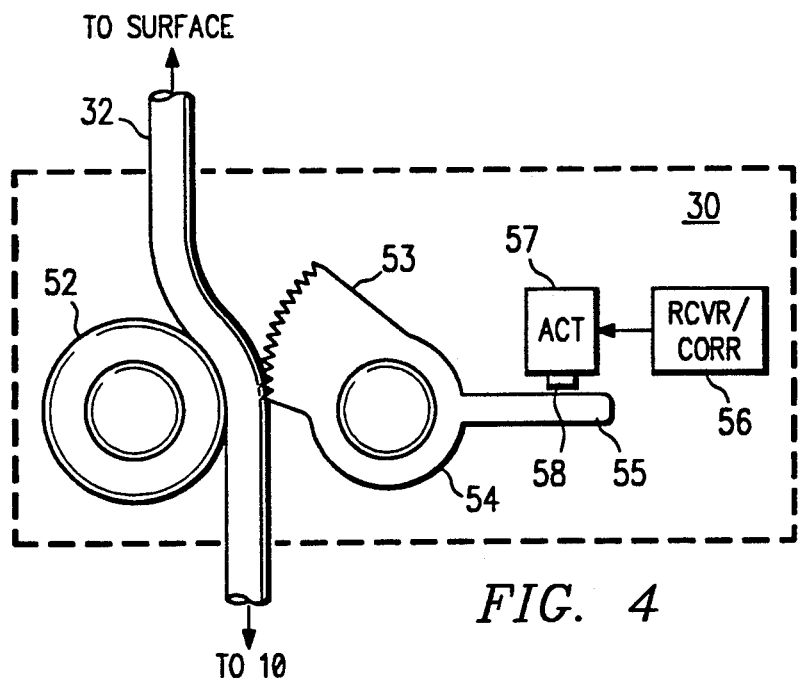
FIG. 4 illustrates a control clamp as used in the system of FIG. 3.

Control clamps 30 are preferably configured so as to allow tensioning cable 32 therein to pass through in one direction, namely to allow the surface vessel or platform to tighten tensioning cables 32, with control clamps 30 maintaining the tightened position. In addition, control clamps 30 are preferably controllable by a signal, such as an acoustic signal transmitted through the water or an electrical signal directly hardwired thereto, so that control clamps 30 can be remotely controlled to release the tensioning cable 32 passing therethrough. Referring now to FIG. 4, the construction of one of control clamps 30 will now be described in further detail.

Control clamp 30, in the example of FIG. 4, is constructed and operates in similar fashion as a conventional snubber. Accordingly, control clamp 30 includes rollers 52 and 54, each of which rotate about a fastening bolt. Roller 54 includes a teethed cam 53, for engaging tensioning cable 32 as will be discussed hereinbelow. Flange 55 also extends from roller 54, on another side thereof. Control clamp 30 further is designed to release tensioning cable 32 upon a signal. In this example of control clamp 30, acoustic receiver/correlator 56, which may be constructed similarly as described hereinabove for acoustic release 12, has its output coupled to an actuator 57. Actuator 57 may be constructed as a solenoid, as an explosive actuator, or according to other known techniques such that piston 58 therein may be pushed against flange 55 of roller 54, to release tensioning cable 32 in the manner described hereinbelow.

In operation, tensioning cable 32 passes between roller 52 and cam 53 in control clamp 30 when pulled from the end at the surface. In the usual manner for snubbers, the teeth of cam 53 engage tensioning cable 32 to prevent its movement through control clamp 30 when pulled from its end connected to its associated array 10. As is evident from FIG. 3, float 18 of array 10 will exert a force on tensioning cable 32 connected thereto. Control clamp 30 thus provides one-way travel of tensioning cable 32, such that a winch at the surface can pull tensioning cable 32 to set the angle and position of its associated array 10; control clamp 30 maintains the desired position of tensioning cable 32 without continued maintenance of tension thereon from the surface.

Release of tensioning cable 32 is accomplished in this example of control clamp 30 by the transmission of an acoustic signal of a code which has previously been assigned to, and stored within, receiver/correlator 56. Upon receiving the matching code of the acoustic signal, in similar manner as described hereinabove for acoustic release 12, receiver/correlator 56 causes actuator 57 to force piston 58 against flange 55. Sufficient force against flange 55 will cause teethed cam 53 to disengage from tensioning cable 32, allowing for retrieval of array 10 or, alternatively, adjustment of the position of array 10 closer to its vertical attitude.

Alternatively to the positioning of control clamps 30 within central anchor 28, other methods of controlling the length and position of tensioning cables 32 therefrom may be used. For example, a pulley may be mounted on the top or side surfaces of central anchor 28 by way of a swivel to allow rotation of the pulley at varying angles from central anchor 28. Such an arrangement may be particularly useful where currents or other attributes of the survey location would limit the ability to accurately position anchors 11, as the swivels could freely rotate over a wide range of angles. A locking mechanism such as a rachet could also be provided for the pulley, in combination with a snubber or other mechanism for engaging the tensioning cable, to maintain the length of the tensioning cables 32 between central anchor 28 and arrays 10.

It is contemplated that other alternative arrangements for fixing the length and angle of tensioning cables 32 between central anchor 28 and the associated arrays 10 will now be apparent to those of ordinary skill in the art having reference to this specification. Furthermore, while FIG. 3 illustrates a system having four arrays 10 in combination with central anchor 28, an arbitrary number of arrays 10 may be so deployed, ranging from a single array 10, to as many arrays 10 as desired in the survey and which may be practically deployed relative to a single central anchor 28.

Referring back to FIG. 3, it should be noted that positioning transponders 34 may optionally be placed near the system of arrays 10, for example between anchors 11 of adjacent arrays 10, either supplementing, or instead of, positioning transponders 14 in arrays 10. Positioning transponders 34 would preferably receive and transmit laser or acoustic signals to the surface vessel or platform, as described hereinabove, so that a precise determination of the system position could be made.

In addition, it is desirable that a positioning transponder 35 be located on or within central anchor 28, so that its precise position could be monitored by way of acoustic, laser, or other conventional positioning signal techniques.

In operation, as further described in the above-referenced copending application Ser. No. 697,573, marine seismic surveying may be accomplished using such a system of arrays 10 as shown in FIG. 3, together with a source boat which generates source seismic signals in the conventional manner, for example by towing an air gun or explosive source. Both an individual array 10 and the system of such arrays as shown in FIG. 3 provide arrangement of hydrophones, together with both depth and position indication, so as to provide thorough receipt of reflected and refracted seismic energy, depending upon the type of survey undertaken. The system of arrays 10 in FIG. 3 is particularly adapted to 3-D marine seismic surveys, especially where azimuthal gathers are of importance.

The conducting of such a seismic survey, in the example of the system of FIG. 3, would begin with the deployment of arrays 10 and center anchor 28 at the desired locations. Arrays 10 would be initially deployed with tensioning cables 32 slack, with each array 10 in substantially a vertical attitude. Upon placement of arrays 10 in the desired locations, the surface vessel can then winch those tensioning cables 32 to the extent that their associated arrays 10 are placed at an angle from the horizontal. Control clamps 30 are then operable to maintain the desired angle without tension from the surface being maintained.

It should be noted that position transponders 14 and depth transducers 16 may be interrogated during the deployment process, to provide feedback relative to whether or not arrays 10 are in the proper position, particularly relative to the tension of tensioning cables 32. Position transponders and depth transducers 16 may continue to provide position and depth information, respectively, throughout the survey as well.

Once the system of arrays 10 is placed and tensioned as desired, a seismic source signal is applied in the conventional manner, for example from a source vessel in the vicinity of the system of arrays 10. Of course, other alternative seismic sources may be utilized, including explosive and other sources located on the seafloor, and the like. The return seismic energy is sensed by hydrophones 15 in the conventional manner, and communicated to the surface by radio, acoustic signals, or such other methods as described hereinabove relative to the construction of array 10. Recording and processing of the sensed information is then performed at the surface in the conventional manner, either on site or at a later time in a computing center, to provide the results of the survey.

It should be noted that the system of FIG. 3 is especially adaptable to perform the method described in the above-referenced U.S. Pat. No. 4,353,121, incorporated herein by this reference, only altered to the extent required to analyze data from bottom-mounted sensors as in the system of FIG. 3. For performing this method, tensioning cables 32 preferably are set so that arrays 10 are substantially horizontal, with a slight angle therefrom to provide increasing time between direct and ghost signals over the length of each array 10. Stacking of the primary signal received by hydrophones 15 will, according to this method, reinforce the primary signal with the ghost reflections not so reinforced, eliminating the need for and the noise resulting from inverse filtering.

As a result of the above-described embodiments of the vertical seismic arrays and systems using the same, marine seismic surveys can be made using sensing equipment anchored to the seafloor, with much reduced likelihoods of damage during deployment and retrieval. The ability to release the array from its anchor is of significant benefit in the retrieval operation. Furthermore, the actively transmitting position transponders and depth transducers provide precise positioning information relative to the array. In addition, the system using such arrays can provide for control of the lateral position of each of the arrays by way of tensioning cables, such that efficient and cost-effective marine seismic surveys can be performed.

Retrieval of arrays 10 from the system of FIG. 3, upon completion of the seismic survey, is accomplished in the manner described hereinabove relative to array 10 of FIG. 1. Remotely controllable release 12, for each array 10, would receive an acoustic or other signal indicating that cable 13 is to be released from its associated anchor 11; in addition, each of control clamps 30 at central anchor 28 would preferably also receive a signal indicating that tensioning cables 32 being held therein are also to be released. Floats 18 (in conjunction with float 26 if included) would then cause each of the arrays 10 (without its associated anchor 11) to float to the surface for retrieval by the appropriate surface craft. Tensioning cables 32 could either be disconnected from arrays 10 at the surface after such release, or be disconnected from the surface tensioning vessel prior to such release; in either case the retrieving vessel can retrieve tensioning cables 32 on retrieval of the arrays.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A system for receiving seismic energy in a marine seismic survey, comprising:
    a first sensor array, comprising:
        a cable, having first and second ends;
        a plurality of hydrophones, each coupled to said cable along its length;
        a floatation device coupled to the first end of said cable; and
        an anchor, coupled to the second end of said cable; and
    a positioning anchor;
    a first tensioning cable, extending from said positioning anchor and connected to said first end of said cable, for defining the angle of said first sensor array relative to the vertical according to the length of said tensioning cable between the positioning anchor and said first sensor array.

2. The system of claim 1, wherein said first sensor array further comprises:
    means for coupling the second end of said cable to said anchor, and for releasing said cable from said anchor responsive to a signal.

3. The system of claim 1, further comprising:
    a second sensor array, comprising:
        a cable, having first and second ends;
        a plurality of hydrophones, each coupled to said cable along its length;
        a floatation device coupled to the first end of said cable; and
        an anchor, coupled to the second end of said cable; and
    a second tensioning cable, extending from said positioning anchor and connected to said first end of said cable of said second sensor array, for defining the angle of said second sensor array relative to the vertical according to the length of said tensioning cable between the positioning anchor and said second sensor array.

4. The system of claim 2, wherein said first sensor array further comprises:
    a linking cable coupled to said anchor and to said coupling means; and
    means for retracting said linking cable toward said anchor.

5. The system of claim 1, further comprising:
    a control clamp disposed at said positioning anchor, for clamping said first tensioning cable.

6. The system of claim 1, further comprising:
    a position transponder, for generating a signal from which the position of the position transponder may be determined, said position transponder located at a known location in said array.

7. The system of claim 6, wherein said position transponder is mounted to said positioning anchor.

8. The system of claim 6, wherein said position transponder is coupled to said cable of said first sensor array.

9. The system of claim 3, wherein said first and second sensor arrays are positioned symmetrically relative to said positioning anchor.

10. A method for performing a marine seismic survey with a sensor array having a plurality of hydrophones mounted along a cable, said cable coupled to a flotation device on one end thereof and an anchor on another end thereof, the method comprising:
  placing said sensor array into the area to be surveyed in such a manner that said anchor is in a fixed position relative to the area;
  after said placing step, adjusting the angle of said sensor array from the vertical;
  providing seismic energy at a location remote from said sensor array;
  sensing seismic energy with said hydrophones and communicating the sensed seismic energy to a recording station;
  releasing said sensor array from said anchor; and
  retrieving said sensor array.

11. The method of claim 10, wherein said adjusting step comprises:
  retracting a tensioning cable connected near the floatation device of said sensor array, and extending from a positioning anchor located near said sensor array, said retracting step pulling said sensor array from a vertical attitude.

12. The method of claim 11, further comprising:
  clamping said tensioning cable at said positioning anchor after said retracting step.

13. The method of claim 10, further comprising:
  transmitting a position signal from a transponder mounted along said sensor array;
  receiving said position signal from said transponder; and determining the position of said transponder from said received signal.

14. The method of claim 10, wherein said sensor array further includes a depth transducer mounted therealong, and further comprising:
  receiving a signal from said depth transducer corresponding to its depth after said placing step.

15. The method of claim 10, wherein said placing step comprises placing a plurality of said sensor arrays.

16. A method for performing a marine seismic survey with a sensor array having a plurality of hydrophones mounted along a cable, said cable coupled to a floatation device on one end thereof and an anchor on another end thereof, the method comprising:
  placing said anchor in a fixed position relative to the area to be surveyed so that said sensor array is placed into the area;
  adjusting the angle of said sensor array from the vertical
  providing seismic energy at a location remote from said sensor array; and
  sensing seismic energy with said hydrophones and communicating the sensed seismic energy to a recording station.

17. The method of claim 16, wherein said adjusting step comprises:
  retracting a tensioning cable connected near the floatation device of said sensor array, and extending from a positioning anchor located near said sensor array, said retracting step pulling said sensor array from a vertical attitude.

18. The method of claim 17, further comprising:
  clamping said tensioning cable at said positioning anchor after said retracting step.

19. The method of claim 16, further comprising:
  transmitting a position signal from a transponder mounted along said sensor array;
  receiving said position signal from said transponder; and
  determining the position of said transponder from said received signal.

20. The method of claim 16, wherein said sensor array further includes a depth transducer mounted therealong, and further comprising:
  receiving a signal from said depth transducer corresponding to its depth after said placing step.

* * * * *